March 26, 1968     D. J. TREVARROW, JR     3,374,805
PRESSURE RELIEF VALVE
Filed Aug. 16, 1965
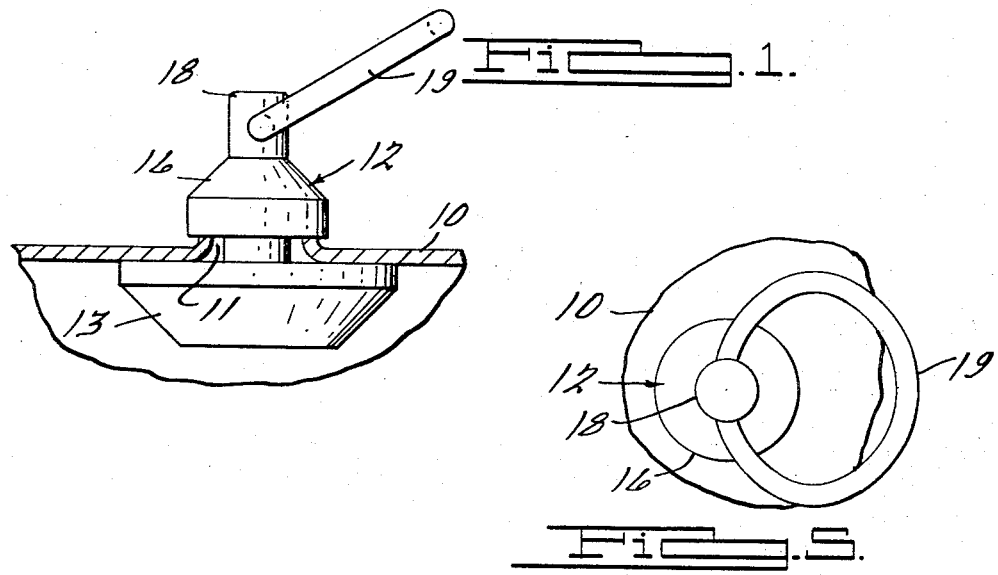
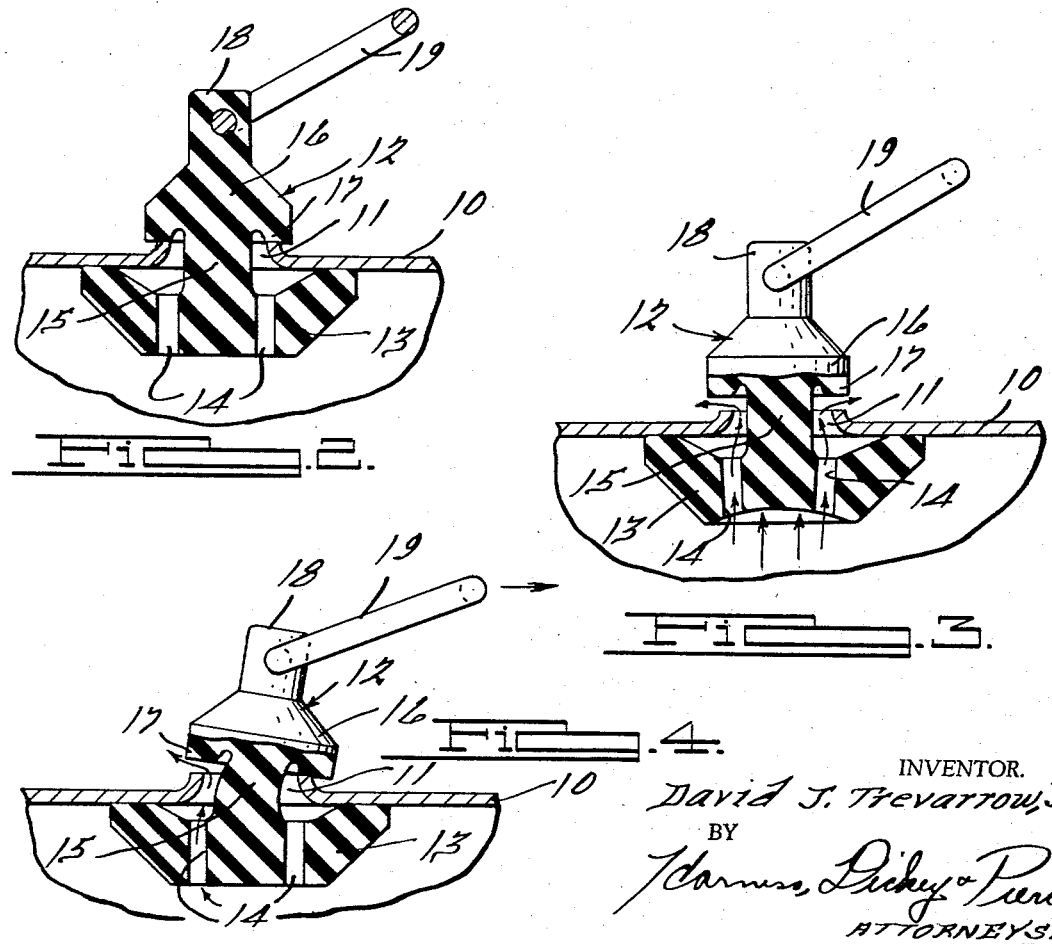
INVENTOR.
David J. Trevarrow, Jr.
BY
Harness, Dickey & Pierce
ATTORNEYS.

United States Patent Office 3,374,805
Patented Mar. 26, 1968

---

3,374,805
PRESSURE RELIEF VALVE
David J. Trevarrow, Jr., Maple Glen, Pa., assignor to Kelsey-Hayes Company, Romulus, Mich., a corporation of Delaware
Filed Aug. 16, 1965, Ser. No. 479,934
3 Claims. (Cl. 137—525)

ABSTRACT OF THE DISCLOSURE

A one piece pressure relief valve for a container that is either automatically or manually operable for permitting the escape of excess gas from the container.

---

This invention relates to relief valves and, more particularly, to a pressure relief valve for use with a beverage container or other pressure containers in which it is desirable to provide a relief valve which is operable either automatically by the pressure within the container, or manually.

An object of this invention is to provide a one-piece valve of this type comprising a pressure deformable portion engaging the inside of the container and provided with openings therethrough, a reduced neck portion extending loosely through an opening in the container, and a head portion connected to said neck portion and sealing said opening, whereby said head may be moved to open position by the deformation of said deformable portion, and may be manually laterally displaced to move said head portion out of sealing contact with the container, both permitting the escape of excess gas from said container.

Another object of this invention is to provide a device of this type which is so reduced in the number and character of its component parts as to approach the ultimate in structural simplicity to thereby create an economy in its manufacture, installation and maintenance costs.

Another object of this invention is to provide a pressure relief valve of this type which is efficient, durable and of simple construction, whereby it may be economically manufactured by a simple molding operation.

The various objects and advantages, and the novel details of construction of one commercially practical embodiment of the invention, will become more apparent as this description proceeds, especially when considered in connection with the accompanying drawings, in which:

FIGURE 1 is a fragmentary sectional elevational view through a tank showing the relief valve of this invention in elevation and in closed position;

FIGURE 2 is a similar view with the valve in section;

FIGURE 3 is a sectional view showing the valve in open position caused by the excess pressure within the container;

FIGURE 4 is a sectional view showing the valve in its open position when manually operated; and FIGURE 5 is a top plan view of the valve as shown in FIGURE 1.

Referring now to the drawings, it will be noted that there is fragmentarily illustrated a container or tank 10 adapted to contain a carbonated beverage or any other carbonated or gaseous liquid. The tank 10 is provided with a preferably flanged opening 11 adapted to receive the pressure relief valve 12 of this invention.

The valve 12 is adapted to be made of rubber or some other resilient elastomeric material which is resiliently deformable. The valve member is made in one piece and comprises an inverted substantially umbrella-shaped or substantially dish-shaped portion 13 engaging the inside of the container around the opening 11. This portion of the valve is provided with one or more openings 14 extending therethrough. A neck or stem portion 15 of less diameter than the opening 11 in the container extends loosely through this opening 11, thereby leaving a space around the neck portion 15.

The upper end of the neck or stem portion 15 carries a head portion 16 provided with an annular rib 17 adapted to seat on the flange around the opening 11 in the tank to close and seal the same.

Extending or projecting from the head 16 is a substantially reduced portion 18. Attached to the portion 18 is a ring-like handle member 19 by which the stem 15 and head 16 may be laterally displaced to move the head portion out of sealing contact with the container, as shown in FIGURE 4 of the drawings.

The valve may be operated either automatically by the pressure within the container, as shown in FIGURE 3, or manually, as shown in FIGURE 4. When the internal pressure against the inner end of the valve overcomes the sealing resistance of the valve, the dish-shaped portion 13 of the valve is deformed, as shown in FIGURE 3, and lifts the stem 15 and the head 16 from the valve seat 11 to permit the escape of gas from within the container 10. When the pressure within the tank 10 has been reduced below the pressure necessary to distort the valve, the head 12 will again seat itself upon the opening 11. The gas within the tank may also be vented manually by tilting the valve head 16, as shown in FIGURE 4. This may be done by pulling on the member 19 or pushing on the portion 18.

As stated, the valve is made of rubber or some other resilient compressible material and thus may be distorted enough to be inserted into the opening 11 in the tank 10. When thus associated with the tank, it provides a pressure relief valve which is operable either automatically by the pressure within the container, or manually by pulling the ring-like member 19 or pushing sideways on the stem 15 of the valve, causing the displacement of the valve head 16. Thus, the valve provides a simple but expedient means for controlling the pressure within the tank 10.

While one commercially practical embodiment of the invention has been described and illustrated herein somewhat in detail, it will be understood that various changes may be made as may come within the purview of the accompanying claims.

1. A pressure relief valve for use with a container having an opening in a wall thereof, said valve comprising a deformable valve body having a first portion having a part thereof engaging one side of the container wall adjacent the opening, a neck portion extending from said first portion through said opening, a head portion connected to said neck portion and having a part engaging the other side of the container wall around the opening for sealing the opening, passage means defined at least in part by said valve body for exposing the surface of said head portion between said part and said neck portion to the pressure on said one side of said wall, the distance between said parts of said first portion and said head portion being at least equal to the distance between the repective areas of the walls engaged by said parts for maintaining said parts in engagement with the wall surfaces, at least one of said portion and said neck portion being deformable in response to a predetermined pressure differential on opposite sides of the wall for bodily movement of said head portion away from the respective side of the wall without any substantial deflection of said head portion for opening said valve.

2. A pressure relief valve as set forth in claim 1 wherein the first portion of the valve body is generally dish-shaped, the part of said dish-shaped portion that engages the one side of the wall being in engagement with said one side of said wall around the opening, the passage means comprising at least one opening formed in said dish-shaped portion adjacent the neck portion, said neck portion being smaller than the opening for facilitating the exertion of pressure from said opening upon the head portion.

3. A pressure relief valve as set forth in claim 1 further including a handle member connected to the head portion for lateral displacement of the neck and head portions by exerting a force upon said handle member for moving the part of said head portion out of contact with the respective side of the wall.

References Cited
UNITED STATES PATENTS

| | | | |
|---|---|---|---|
| 975,120 | 11/1910 | Carlton | 137—495 |
| 1,612,845 | 1/1927 | Wentorf | 220—44 XR |
| 2,124,455 | 7/1938 | Hopkins | 220—44 XR |
| 2,224,296 | 12/1940 | Hoffman | 220—44 |
| 2,427,764 | 9/1947 | Carson | 220—44 |
| 2,638,263 | 5/1953 | Jesnig | 137—525 XR |
| 3,134,514 | 5/1964 | Booth | 137—496 XR |

WILLIAM F. O'DEA, *Primary Examiner.*

W. WRIGHT, *Assistant Examiner.*